US009649555B2

(12) United States Patent
Markus

(10) Patent No.: US 9,649,555 B2
(45) Date of Patent: May 16, 2017

(54) SYSTEM AND PROCESS FOR A PUZZLE GAME

(71) Applicant: Brain Enterprises, LLC, Highland Park, IL (US)

(72) Inventor: Donalee Markus, Highland Park, IL (US)

(73) Assignee: Brain Enterprises, LLC, Highland Park, IL (US)

( * ) Notice: Subject to any disclaimer, the term of this patent is extended or adjusted under 35 U.S.C. 154(b) by 317 days.

(21) Appl. No.: 14/279,370

(22) Filed: May 16, 2014

(65) Prior Publication Data

US 2014/0342792 A1 Nov. 20, 2014

Related U.S. Application Data

(60) Provisional application No. 61/824,407, filed on May 17, 2013.

(51) Int. Cl.
| | | |
|---|---|---|
| A63F 13/00 | (2014.01) | |
| G06T 11/00 | (2006.01) | |
| A63F 9/10 | (2006.01) | |

(52) U.S. Cl.
CPC .............. *A63F 13/00* (2013.01); *A63F 9/10* (2013.01)

(58) Field of Classification Search
CPC ........... A63F 9/10; A63F 13/005; G06T 11/00
See application file for complete search history.

(56) References Cited

U.S. PATENT DOCUMENTS

| | | | | | |
|---|---|---|---|---|---|
| 3,755,923 | A | * | 9/1973 | Krahn | A63J 15/00 273/157 R |
| 4,052,074 | A | * | 10/1977 | Fogle | A63F 9/10 273/157 R |
| 4,471,960 | A | * | 9/1984 | Murphy | A63F 9/10 273/155 |
| 5,067,714 | A | * | 11/1991 | Rasberry | A63F 9/10 273/157 R |
| 6,106,299 | A | * | 8/2000 | Ackermann | G09B 5/02 434/118 |
| 7,255,345 | B2 | * | 8/2007 | Wood | A63F 9/12 273/157 R |
| 8,643,679 | B2 | * | 2/2014 | Ohnishi | G06T 11/60 345/650 |
| 8,690,673 | B2 | * | 4/2014 | Horita | A63F 13/42 345/659 |
| 8,900,043 | B1 | * | 12/2014 | Elias | A63F 13/655 273/153 R |

(Continued)

*Primary Examiner* — Kang Hu
*Assistant Examiner* — Malina D Blaise
(74) *Attorney, Agent, or Firm* — Miller Canfield Paddock and Stone; Mark L Maki

(57) ABSTRACT

A method for providing a puzzle game on a computing device includes displaying a source image on the computing device; dividing the source image into discrete divided sections; displaying on the computing device the source image divided into the divided sections; creating and then displaying on the computing device kaleidoscopic images, each kaleidoscopic image corresponding to one of the divided sections; and permitting a user to play the puzzle game by permitting the user to select a kaleidoscopic image that corresponds to one of the divided sections from the displayed kaleidoscopic images.

16 Claims, 5 Drawing Sheets

(56) References Cited

U.S. PATENT DOCUMENTS

| | | | |
|---|---|---|---|
| 2004/0127279 A1* | 7/2004 | Gatto | A63F 3/0645 |
| | | | 463/17 |
| 2004/0239029 A1* | 12/2004 | Wood | A63F 9/12 |
| | | | 273/156 |
| 2005/0230909 A1* | 10/2005 | Gallant | A63F 9/10 |
| | | | 273/156 |
| 2008/0182635 A1* | 7/2008 | Chiu | A63F 13/10 |
| | | | 463/11 |
| 2010/0080491 A1* | 4/2010 | Ohnishi | G06F 3/03545 |
| | | | 382/298 |
| 2010/0091023 A1* | 4/2010 | Desruisseaux | G06T 17/20 |
| | | | 345/441 |
| 2010/0247062 A1* | 9/2010 | Bailey | G11B 27/034 |
| | | | 386/280 |
| 2010/0302643 A1* | 12/2010 | Larreta | G02B 27/08 |
| | | | 359/616 |
| 2012/0025462 A1* | 2/2012 | Knowlton | A63F 9/10 |
| | | | 273/157 R |

* cited by examiner

SYSTEM AND PROCESS FOR A PUZZLE GAME

CROSS-REFERENCE TO RELATED APPLICATIONS

This application claims priority to and all benefits of U.S. Provisional Application No. 61/824,407, filed on May 17, 2013, and entitled "System and Process for a Puzzle Game." The subject matter of this priority document is incorporated by reference herein.

BACKGROUND

This disclosure relates to a method and system for a puzzle game which develops and strengthens visual imagery and cognitive skills necessary to do mathematical manipulations.

Mathematicians use rules to structure their thoughts, but they also explore their thoughts from every possible perspective. Through visual processing, math-oriented individuals manipulate images in their minds. They determine, based on a specific goal, which details are relevant and which are not to solve the problem. Mathematicians use their visual systems consciously and intentionally to organize information and to generate alternatives to complex problems. The study of math is helpful for learning to think in a logical, orderly way about the relationship between things in the past, the present, and the future. Even more directly, math is a precise way of describing patterns.

Patterns are regularities that individuals can recognize. Where no recognizable pattern exists, there is chaos. Pattern recognition allows individuals to communicate knowledge to others in a way that they can understand and use it to create new theories.

Visual imagery, which is the foundation of abstract thinking and mathematics, relates to an individual's ability to translate verbal information into a mental picture. The imaged picture may enable the individual to "see" relationships and to link these relationships to other ideas. Therefore, visual imagery is also the essence of creativity and discovery.

Traditional programs teach math through rules and practice problems, thus reinforcing the concept that mathematical thinking is a verbal process. Most recipients of this traditional training are not able to remember or to apply math to real life situations.

SUMMARY

The present invention relates to puzzle games capable of developing and strengthening an individual's visual imagery and cognitive skills. To solve these puzzles, the individual must use visual imagery to compare, contrast, rotate and reflect parts of a whole image to create a new image. Therefore, these puzzles allow an individual to rehearse and to habituate the cognitive processes necessary for complex decision making and mathematics. The puzzles also provide individuals who have weak, undeveloped, or lost visual imagery the opportunities to develop or redevelop such skills. Further, the present invention can permit individuals to create their own puzzles and, thus, encourage them to solve the puzzles and play the game. Many individuals who suffer traumatic brain injury, stroke, concussion, cancer and/or effects of chemotherapy, etc. find it difficult, if not impossible, to regain their math skills, abstract thinking abilities and their complex problem solving abilities. For the brain to heal and establish previous learned behaviors requires rehearsal with numerous, novel exercises.

The present invention relates to puzzles played on computing devices including mobile devices, such as personal computers, smart phones or tablets. More specifically, the present disclosure provides a system and process implemented on a computing device, for a puzzle game which develops and strengthens the prerequisite visual imagery skills needed for abstract thinking and mathematics. The puzzle game disclosed herein is designed to habituate mathematical thinking which strengthens concentration, memory and catalyzes creativity.

The puzzle game accomplishes this task by creating and providing an individual (e.g., a user) with kaleidoscopic images created from part of an original, or source, image. To solve the puzzle, the user must identify the correct part of the source image which was rearranged by reflection and replication to create a new, complex image, for example, a kaleidoscope image. Kaleidoscope images give the user an opportunity to rehearse visual imagery skills which enhance thinking and complex problem solving. As described in more detail herein, to solve the puzzle, a user is required to identify certain characteristics within the kaleidoscopic image and the relationship between these characteristics. In the kaleidoscope image, the characteristics have been rotated, flipped and reflected to create complex visual patterns. To solve the puzzle game, the user is required to visualize conditions that create the new design. Visual imagery is the foundation of abstract thinking and mathematics.

In one embodiment, the disclosed method or system contains a series of software programs that are loaded and operated on a computing device, which includes but is not limited to a computer, a notebook, a tablet, and a cell phone.

In another embodiment, the disclosed method comprises one or more of the following steps: (1) displaying a source image on the computing device, (2) dividing or splitting the source image into a discrete number of divided sections; (3) creating and then displaying one or more kaleidoscopic images each corresponding to one of the divided sections; (4) permitting the user to play the puzzle game by selecting the kaleidoscopic image that corresponds to its divided section.

In one embodiment, the disclosed process can further comprise one or more of the following steps: (6) submitting the selections after the user selects one or more kaleidoscopic images each corresponding to a divided section; (7) calculating and displaying a score based on performance of the user; and (8) sharing the score or the kaleidoscopic image via Internet.

In one embodiment, the user can choose the source image to be played for the puzzle game by viewing or searching pictures or photos stored on a computing device (e.g., a photograph or picture stored in the present system or the computing device). In another embodiment, the user can take a digital photograph by using a camera connected to the computing device (e.g., camera on the cell phone) and use such digital photograph as the source image for the puzzle game.

In another embodiment, the source image is divided equally by one or more centerlines and the divided sections have the same shapes. Additionally, the disclosed method can further comprise a step of editing the source image into a shape before dividing the source image. The shape can be a circle or a symmetric or equilateral polygon. For example, the source image is first cut into a circle and then divided equally into eight divided sections.

In one embodiment, in order to create a kaleidoscopic image, the divided section is taken, rotated, flipped and reflected (e.g., rotated and reflected around the X and Y axis). This process of creation can be duplicated a number of times until each divided section creates one kaleidoscopic image. For example, a source image is divided into eight divided sections. First, one of the divided sections is taken, duplicated, and rotated 90 degrees clockwise, resulting in a first rotated image. The first rotated image is again duplicated and rotated 90 degrees clockwise to create a second rotated image. The duplicating and rotating process is repeated four times to get four rotated images. Next, the divided section is flipped horizontally to get a reflected image. Similarly, the reflected image is repeatedly duplicated and rotated 90 degrees clockwise, resulting in four reflected and rotated images. Finally, the four rotated images and the four reflected and rotated images consolidate into a single kaleidoscopic image. This process can be duplicated until each divided section creates one kaleidoscopic image.

Additionally, the same process can be replicated with different variables (e.g., altering the number of divided sections, editing the source image, changing the colors or using a black and white source image, and modifying the style or number of reflections). For example, if a source image is edited or cut into a circle and then divided into 6 sections, the angle of rotation can be 60 degrees clockwise.

In one embodiment, when the puzzle game begins, the created kaleidoscopic images are displayed, e.g., by being placed in a carousel in a random order. The user can play the game by selecting the kaleidoscopic image that matches or corresponds to its divided section. For example, the user can rotate through the carousel and select the kaleidoscopic image that he believes to be created from the highlighted divided section. Accordingly, the user can select the corresponding kaleidoscopic image for each divided section.

In one embodiment, the user finishes the game and submits the selections. A score is calculated and presented to the user on the computing device. For example, the score is calculated based on correct rate of the user's selections. The user can choose to share the score or his favorite kaleidoscopic image via Internet (e.g., on Facebook, Twitter, Instagram). The user can also choose to start a new game or play again.

The present disclosure also provides a puzzle game. In one embodiment, the puzzle game comprises: an undivided image; a divided image containing a discrete number of divided sections corresponding to the undivided image; and a plurality of kaleidoscopic images each corresponding to one of the divided sections; wherein a user plays the puzzle game by selecting the kaleidoscopic image that corresponds to its divided section. The undivided image can be cut into a shape and then divided equally by one or more centerlines. For example, the undivided image is cut into a circle and then divided equally into a number of divided sections (e.g., 2 sections, 3 sections, 8 sections, etc.).

In one embodiment, the disclosed system for the puzzle game comprises: (1) a module for dividing a source image; (2) a module for creating kaleidoscopic images; (3) a module for displaying; and (4) a graphic user interface ("GUI"), wherein the system is implemented on a computing device.

In one embodiment, the disclosed system can further comprise a module for calculating a score based on performance of the user, and/or a module for sharing the score or the kaleidoscopic image via Internet.

In one embodiment, the module for dividing a source image comprises means to divide the source image into a discrete number of divided sections. Those source images can be divided equally by one or more centerlines. In another embodiment, the module for dividing a source image further include means to cut or edit the source image before dividing the source image into sections. The edited source image can be a regular (i.e., geometric) or an irregular shape. For example, the source image is first cut into a circle and then divided equally into eight divided sections.

In one embodiment, the module for creating kaleidoscopic images comprises means to create a kaleidoscopic image for each divided section by rotating the divided section. The module for displaying the kaleidoscopic images and divided sections comprise means to display the undivided source image, divided image containing a discrete number of divided sections, and the created kaleidoscopic images. For example, the kaleidoscopic images can be displayed in a carousel in a random order.

In one embodiment, the Graphical User Interface ("GUI") allows a user to (1) choose the source image to be played, (2) select the kaleidoscopic images that matches or corresponds to its divided section; and/or (3) edit or submit the selections.

In one embodiment, the user can choose the source image to be played by viewing or searching photos or pictures present in the computing device. In another embodiment, the user can take a digital photograph by a camera connected to the computing device. Additionally the user can edit the settings (e.g., sound, music, background color) through GUI.

The puzzle game system and method described herein allows a user to control the speed, complexity and the variation to meet individual learning requirements, whereby there is no limit to the number of applications in the hands of capable parents, teachers and therapists. The puzzle game system and method allows a user to repeat exercises if desired, and to contemplate their answers for as long as they would like. The puzzle game system and method encourages creativity and motivates the user to rehearse difficult cognitive skills because the individual can develop his own set of exercises to challenge themselves and their friends. In this regard, unlike a paper-based workbook, the puzzle game system and method is interactive, allowing the user to participate in the creation of the exercises that challenge his thinking, whereby the floodgates to higher order thinking may be opened. In addition, the user is empowered by his ability to create visual puzzles within the domain of his interest (i.e., a skate boarder might select images from his sport to create a puzzle while a grandparent might select a family photos to create a puzzle). As a result, the user is motivated to rehearse complex cognitive skills since he is emotionally engaged with the topic used for rehearsal.

The puzzle game system and method encourages a user to
 use and organize several sources of information to reduce uncertainty;
 recognize similarities in diverse situations;
 rotate and flip images in his head to create new patterns;
 determine when additional information is needed to solve the problem;
 integrate a detail into the bigger picture . . . connect the dots;
 practice deliberate rehearsal that may structurally change the brain and to prepare it for complex problem solving that goes beyond the scope of the rehearsal; and
 rehearse at an individualized frequency and speed.

BRIEF DESCRIPTION OF THE DRAWINGS

The above-mentioned and other features of this disclosure and the manner of obtaining them will become more apparent, and the disclosure itself will be best understood by reference to the following descriptions of systems and methods taken in conjunction with the accompanying figures, which are given as on-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following descriptions or illustrated in the figures The disclosed method for a user to play a puzzle game can display a source image or permit the user to first select a photograph or picture as the source image to be played. The source image is divided into a number of divided sections and a series of kaleidoscopic images are created—one kaleidoscopic image for each divided section. The complexity of the kaleidoscopic images depends on the color, shape, detail, negative space and rotation of each divided section, together with the number or location of the reflections during the creating process of kaleidoscopic images. These generated kaleidoscopic images can be placed into a carousel. The user then begins to play the game by rotating through the carousel and select the kaleidoscopic image that he thinks corresponds to the highlighted divided section. The complexity of the kaleidoscopic images requires the user to think both inductively (what is the answer) and deductively (what is not the answer) in order to select the correct kaleidoscopic image. When the user finishes the game, a score is calculated and presented to the user. The user can try the same game again to improve their score.

As shown in the figures, one embodiment (e.g., Build Your Own Puzzles or "BYOPuzzle") according to the present disclosure can be operated on a computing device such as a computer, a notebook, a tablet, and/or a cell phone.

Figure 1:
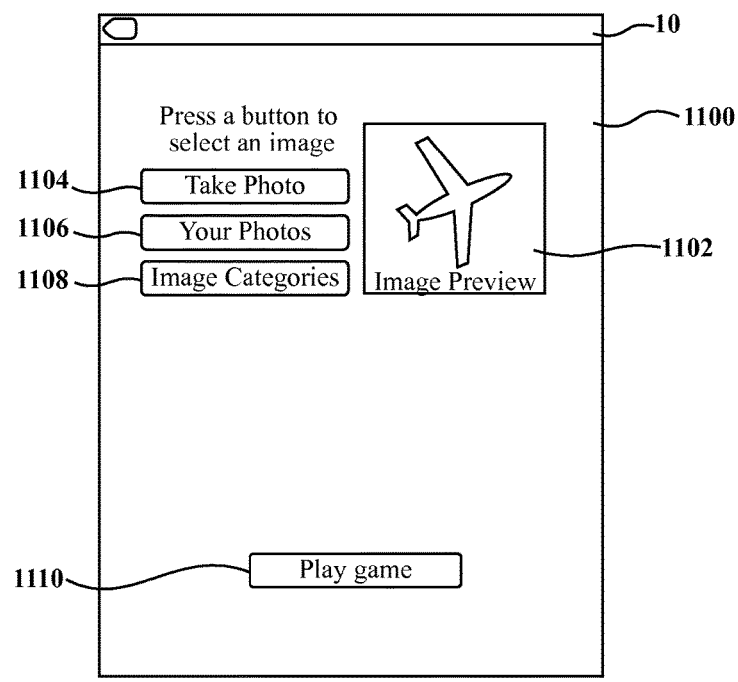
FIG. 1 is an exemplary screenshot for the GUI of the present system showing the "Home Page" view.

FIGS. 1-9 show a series of exemplary screenshots for the GUI of the present system. FIG. 1 shows a screenshot 10 of the main navigation menu or "Home Page" view. On the home page 1100, there is an image preview window 1102 and several icons—i.e., "Take Photo" 1104, "Your Photos" 1106, "Image Categories" 1108, and "Play game" 1110. This puzzle system permits the user to choose a source image and to view the source image through the Image Preview window 1102 before playing the game. The embodiment in FIG. 1 shows a source image having the outline of an airplane.

Figure 2:
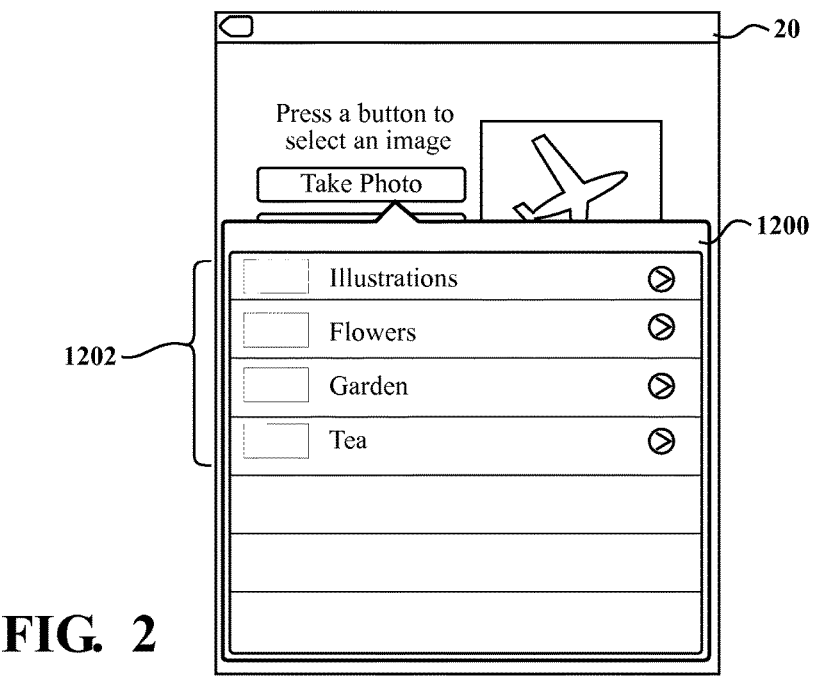
FIG. 2 is an exemplary screenshot for the GUI of the present system showing the "Image Categories" view.
Figure 3:
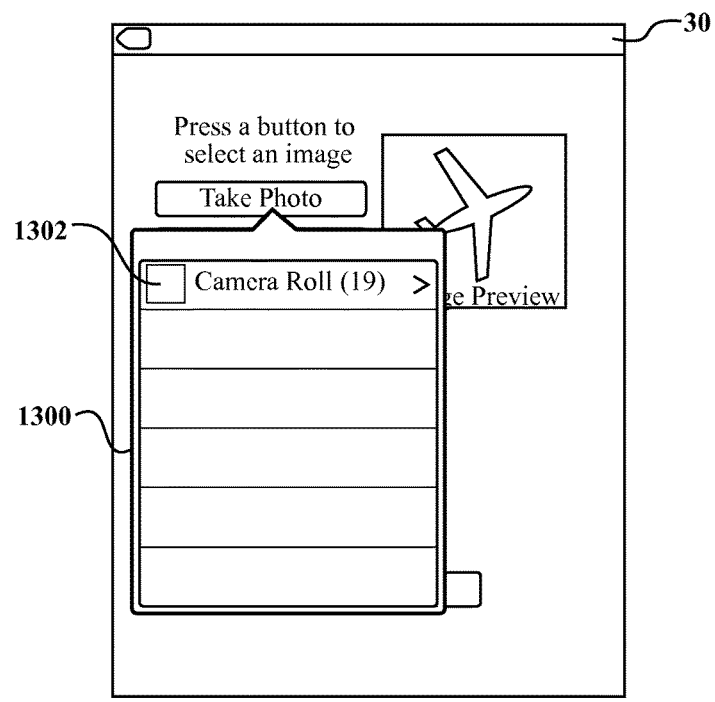
FIG. 3 is an exemplary screenshot for the GUI of the present system showing the "Your Photos" view.

To change the displayed image, a user can click "Image Categories" icon 1108 and then view and select a picture stored in the system, as shown in FIG. 2, which is an example screenshot 20 of "Select a category." The user can choose a category 1202 on the menu 1200 (e.g., "Illustrations," "Flowers," "Garden," or "Tea") and then select a predefined source image from such category for the puzzle. The user may also click "Your Photos" icon 1106 on the home page 1100 in order to choose a source image from those stored in the computing device. For example, FIG. 3 is an exemplary screenshot 30, showing that on the menu 1300 the user can choose an image stored on the device (e.g., the Camera Roll folder 1302 on an iPad). Referring to FIG. 1, the user can click "Take Photo" icon 1104 on the home page 1100 and take a digital photograph by a camera connected to the computing device (e.g., a camera on an iPad) for use as the source image.

Figure 4:
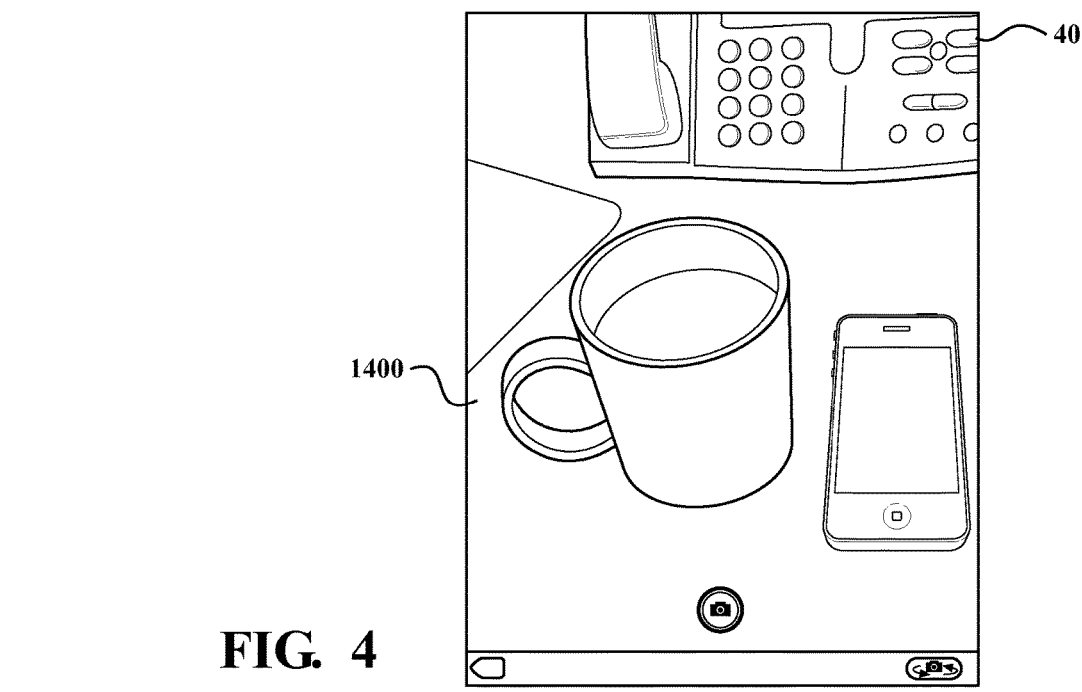
FIG. 4 is an exemplary screenshot for the GUI of the present system showing the "Take Photo" view.
Figure 5:
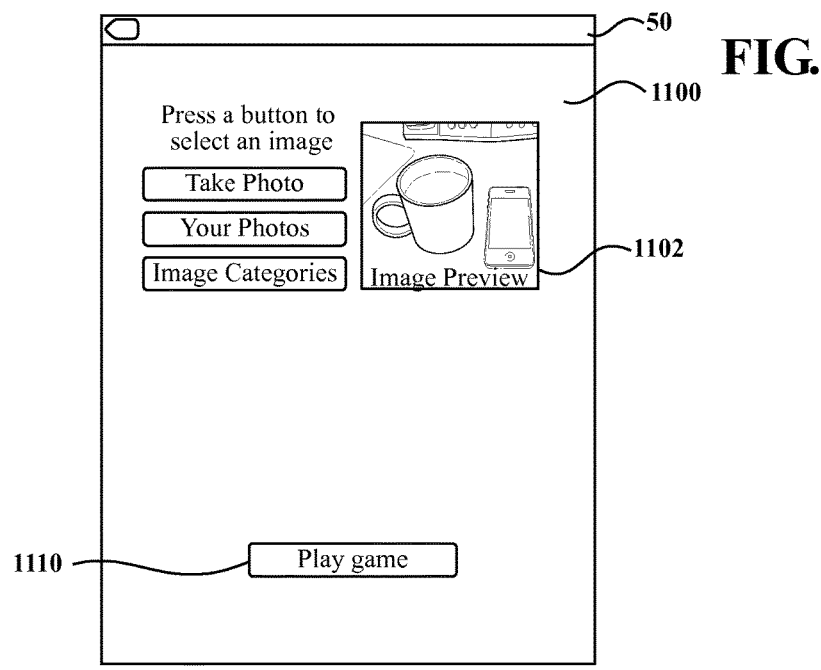
FIG. 5 is an exemplary screenshot for the GUI of the present system showing the "Home Page" view after taking a photo.

Referring to FIG. 4 which is a screenshot 40 of the camera page 1400, an image taken with the computing device is shown. After selecting the photo, the user views the image on the home screen 1100, as shown in FIG. 5 (screenshot 50), where Image Preview window 1102 displays the selected photo. After choosing the source image, the user starts the puzzle game by clicking "Play game" icon 1110.

Figure 6:
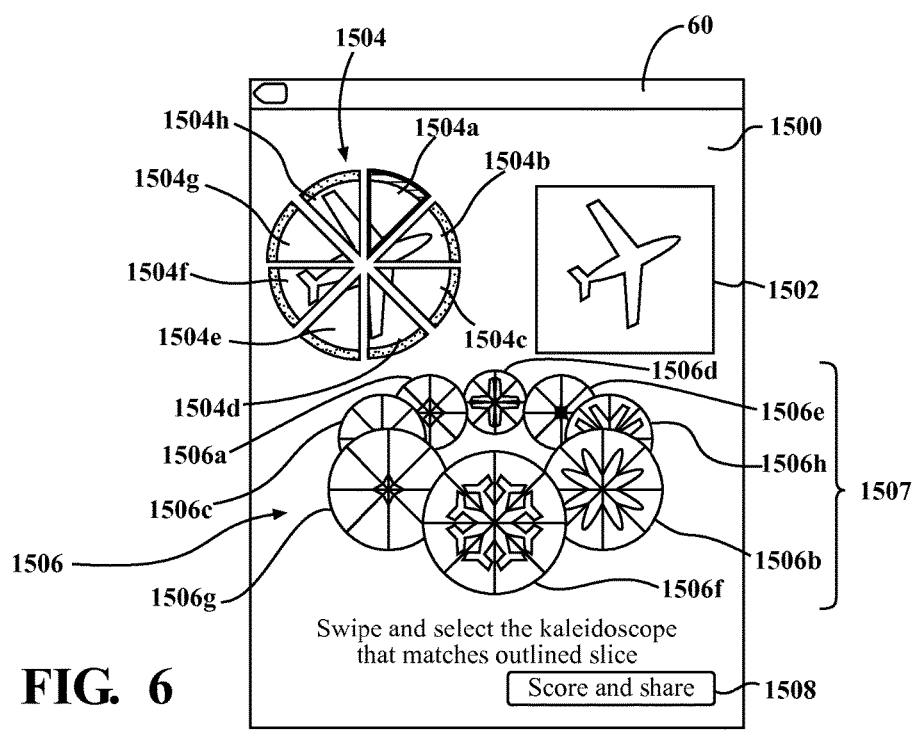
FIG. 6 is an exemplary screenshot for the GUI of the present system showing the "Play Game" view.

FIG. 6 shows a screenshot 60 of the game page 1500 of the puzzle game prior to the user playing the game. On the game page 1500 are displayed the selected source image 1502, a divided image 1504 containing divided sections 1504a-1504h, and kaleidoscopic images 1506 which include divided kaleidoscopic sections 1506a-1506h. The selected source image 1502 in FIG. 6 shows an outline of an airplane. The selected source image 1502 is first cropped into a circle and then divided equally into eight divided sections 1504a-1504h. Thereafter kaleidoscopic images 1506 corresponding to each divided section 1504a-1504h are created and placed into a carousel 1507. Within the carousel 1507, the kaleidoscopic image 1506a corresponds to the divided section 1504a, and the kaleidoscopic image 1506b corresponds to the divided section 1504b and so on. Accordingly, each kaleidoscopic image matches one of the divided sections. The kaleidoscopic images 1506a-1506h are placed into a carousel 1507 in a random order.

As mentioned before, the kaleidoscopic image is created by rotating and reflecting the divided section (e.g., rotating and reflecting around the X and Y axis). Other ways kaleidoscopic images can be created are only limited by the number or reflections and the arrangement of these reflections.

Figure 7:
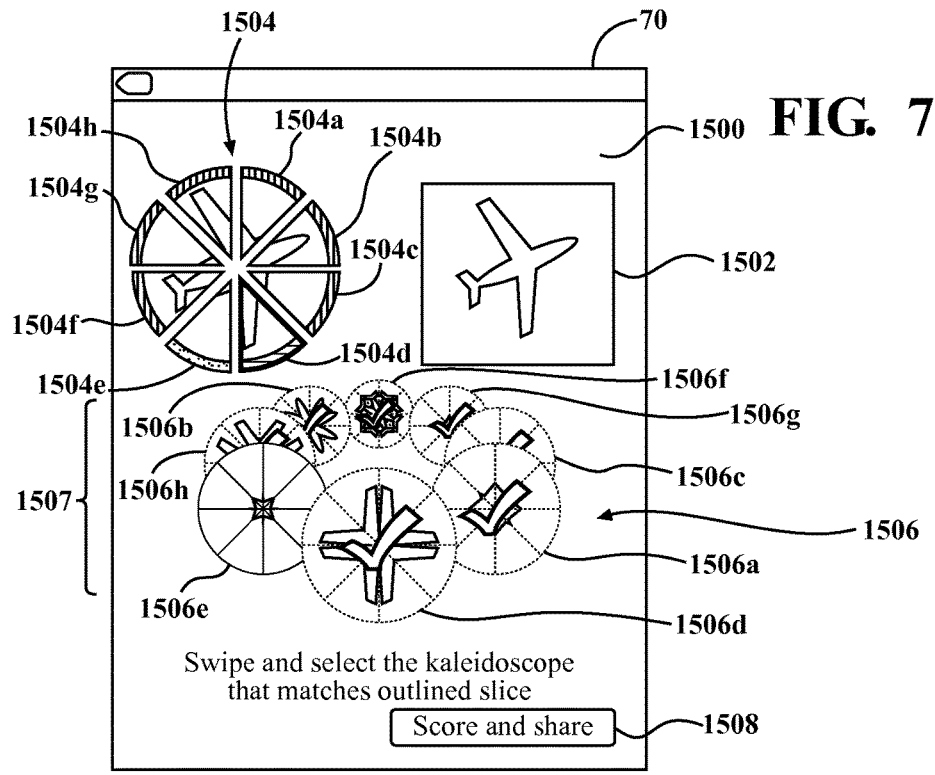
FIG. 7 is another exemplary screenshot for the GUI of the present system showing the "Play Game" view.
Figure 8:
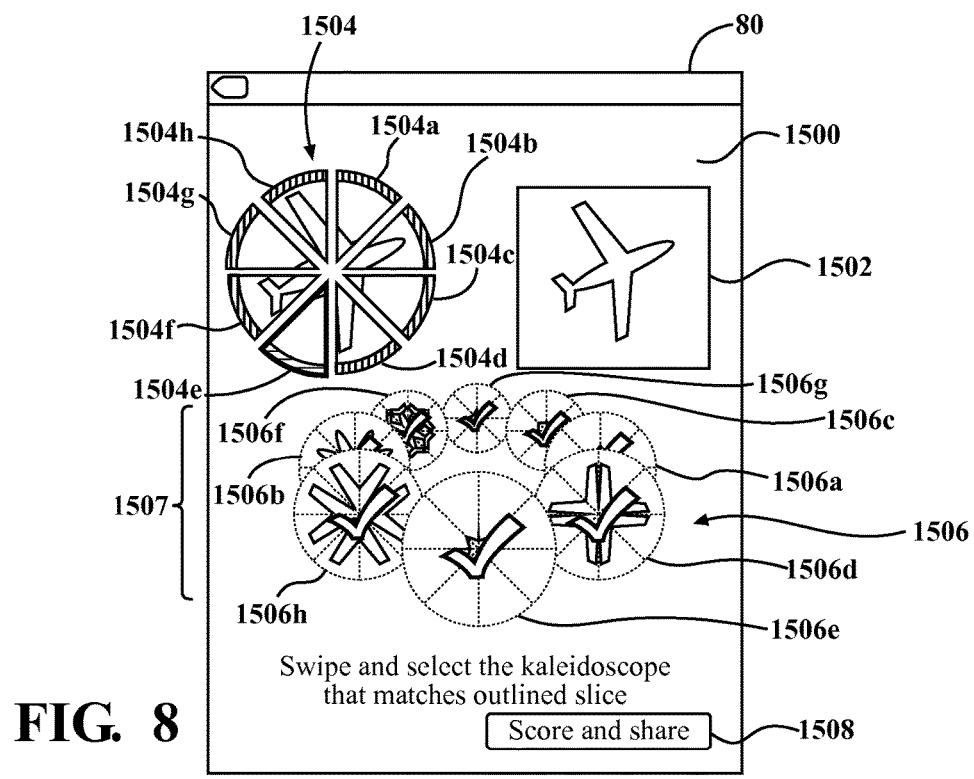
FIG. 8 is another exemplary screenshot for the GUI of the present system showing the "Play Game" view.

FIG. 7 shows the puzzle game during play. The user selects one of the divided sections 1504 and thereafter selects the corresponding kaleidoscopic image 1506 which is a kaleidoscopic representation of the selected divided section 1504. For instance, the highlighted section 1504d indicates the user has selected this section. In the illustrated embodiment, the highlighted section is represented by providing a bold outline to the selected divided section. However, it is understood that other methods can be used to highlight the selected divided section. For example, in a color display, color can be used to visually highlight the selected section or to provide an identifying color border for the selected section (e.g., a blue border). In another example, the selected section could be "greyed out" by changing the intensity of, or removing color from, that portion of the image. After the user selects one of the divided sections 1504, the user then swipes the carousel 1507 and selects the corresponding kaleidoscopic image 1506*d* that matches to the divided section 1504*d*. A check mark will be shown after the kaleidoscopic image 1506*d* is selected indicating the user can select another divided section 1504 to match with one of the remaining kaleidoscopic image 1506. After the game is scored, the user can check his work by returning to the puzzle. Except for the selected and highlighted divided section, other divided sections are marked using a different outline, color, contrast, etc. to indicate those divided sections that have been matched (e.g., 1506*a*-1506*c* and 1504*f*-1504*h* are bordered in green, indicated by hash marks), or to indicate those that have not been selected or matched (e.g., 1506*e* is bordered in red, indicated by stippling). FIG. 8 shows the puzzle game after all of the kaleidoscopic images 1506 have been selected by the user. At that time, there will be no divided sections 1504 marked in red indicating the puzzle game has been completed.

Figure 9:
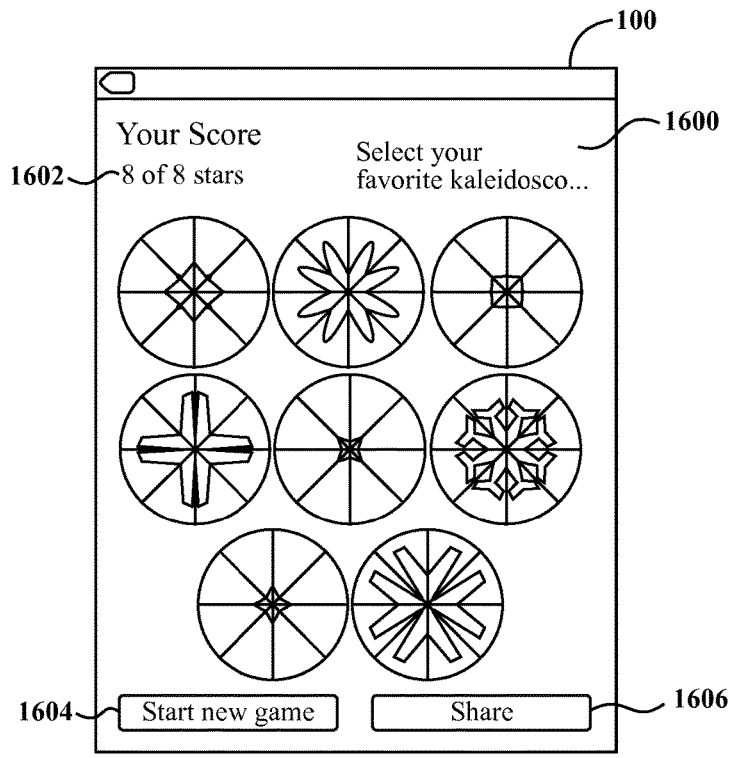
FIG. 9 is an exemplary screenshot for the GUI of the present system showing the "Your Score" view.

Once the user has matched the kaleidoscopic images 1506 with the divided images 1504, the user selects the score and share button 1508 allowing the computing device to score the game. FIG. 9 shows the puzzle game after the user has submitted the game for scoring using the score and share button 1508. The puzzle described herein will calculate a score based on performance of the user. For example, FIG. 9 is an exemplary screenshot 100 of the score page 1600, wherein the score 1602 (e.g., "8 of 8 stars") was generated based upon the user correctly matching each divided image 1504 with each kaleidoscopic image 1506. If the user did not correctly match each divided image 1504 with the corresponding kaleidoscopic image 1506, the user's score would be lower. For instance, if the user only correctly matched 4 divided images 1504 with 4 kaleidoscopic images 1506 out of a total of 8 images, the user's score would be "4 of 8 stars." The object of the puzzle game is to correctly match as many divided images 1504 with kaleidoscopic images 1506. Another feature is the ability of the user to select a favorite kaleidoscopic image and share via Internet (e.g., on Facebook, Twitter, Instagram) by clicking the "Share" icon 1604. The user can also click "Start new game" icon 1606 in order to go to the "Home Page" 1100 again to begin a new game.

Figure 10:
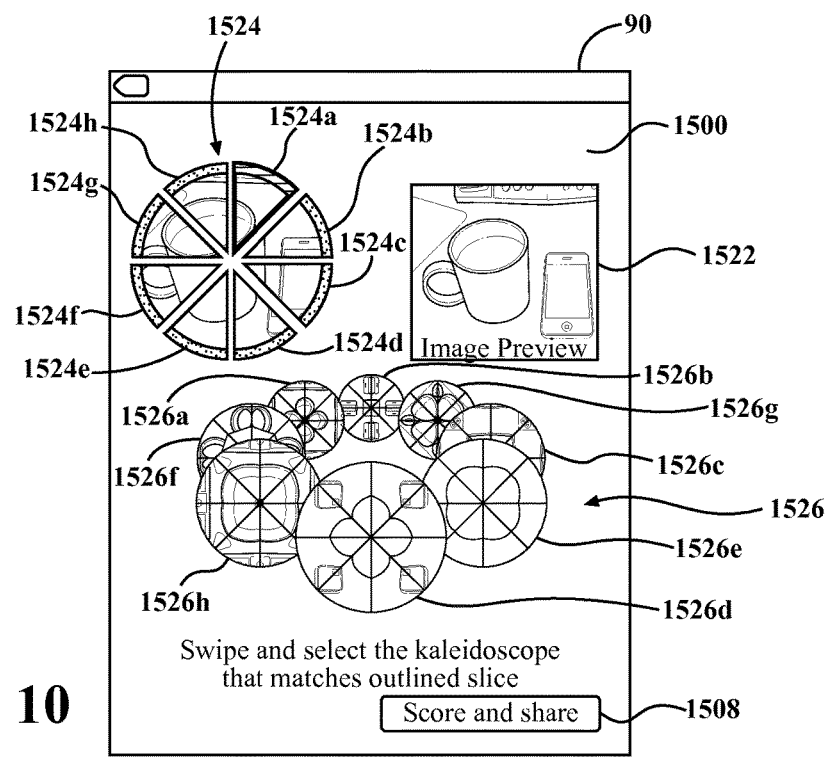
FIG. 10 is another exemplary screenshot for the GUI of the present system showing the "Play Game" view.

FIG. 10 is another exemplary screenshot 90 of the game page 1500 with a different source image. Similarly, the undivided image 1522 is divided into eight divided sections 1524*a*-1524*h*. The kaleidoscopic images 1526*a*-1526*h* are then created from those divided sections. The user plays the game by selecting the kaleidoscopic image 1526 that the user believes matches the selected divided sections 1524 (e.g. 1526*a* corresponding to 1524*a*) as described in detail above. The embodiment in FIG. 10. shows an image taken by the user via the camera connected to the computing device. When compared to the kaleidoscopic images 1506, the kaleidoscopic images 1526 in FIG. 10 are relatively more complex.

The complexity and symmetry of the kaleidoscopic images, together with the configuration of the reflections of the divided sections, determine the difficulty of the puzzle. As the divided sections are rotated, replicated, and reflected and multiple kaleidoscopic image are created from the same image, the user is required to identify and compare more than one variable, pay close attention to discrete details, and think both inductively and deductively in order to solve the puzzle.

The disclosure has been described as having exemplary embodiments and is intended to cover any variations, uses, or adaptations that use its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

The invention claimed is:

1. A method for providing a puzzle game on a computing device comprising:
   storing a source image on the computing device:
   displaying said source image on a graphical user interface of the computing device in a first area of said graphical user interface:
   dividing the source image into a plurality of discrete divided sections;
   displaying on said graphical user interface of the computing device the source image in a second area of said graphical user interface wherein said source image is shown divided into said divided sections;
   creating and then displaying a plurality of kaleidoscopic images in a third area on said graphical user interface of the computing device, each one of said kaleidoscopic images being created by said computing device from a corresponding one of said divided sections; and
   permitting a user to play the puzzle game by permitting the user to select one said kaleidoscopic image that corresponds to one of the divided sections from said plurality of said kaleidoscopic images displayed on said graphical user interface said user selecting one of said kaleidoscopic images for each one of said divided sections displayed on said graphical user interface.

2. The method of claim 1 comprising permitting the user to choose the source image by
   viewing or searching pictures or photographs that are stored in said computing device, and selecting one of the stored pictures or photographs as said source image; or
   taking a digital photograph using a camera connected to the computing device, and selecting the taken digital photograph as said source image.

3. The method of claim 1 further comprising the step of cropping the source image into a predetermined shape before the step of dividing the source image.

4. The method of claim 3 wherein the predetermined shape is a circle.

5. The method of claim 3 wherein the predetermined shape is a geometric or irregular shape.

6. The method of claim 1 wherein the source image is divided equally by one or more centerlines and all of the divided sections have the same shape.

7. The method of claim 3 wherein said source image is cropped into a circular shape and then divided equally into eight divided sections by the step of dividing said source image.

8. The method of claim 1 wherein each said kaleidoscopic image is created by rotating or reflecting a corresponding one of the divided sections.

9. The method of claim 1 further comprising the step of calculating and displaying a score on the computing device based on performance of the user.

10. The method of claim 9 wherein the score is calculated based on a rate of correct selections submitted by the user.

11. The method of claim 9 further comprising a step of sharing the score or the kaleidoscopic image via Internet.

12. A method for providing a puzzle game on a computing device comprising:
  storing a source image on the computing device;
  displaying said source image on a graphical user interface of the computing device in a first area of said graphical user interface;
  dividing the source image into a plurality of discrete divided sections;
  displaying on said graphical user interface of the computing device the source image in a second area of said graphical user interface wherein said source image is shown divided into said divided sections;
  creating and then displaying a plurality of kaleidoscopic images in a third area on said graphical user interface of the computing device, each one of said kaleidoscopic images being created by said computing device from a corresponding one of the said divided sections, wherein the kaleidoscopic images are displayed in a carousel in a random order; and
  permitting a user to play the puzzle game by permitting the user to select one said kaleidoscopic image that corresponds to one of the divided sections from said plurality of said kaleidoscopic images displayed on said graphical user interface.

13. The method of claim 12 wherein the user selects one said kaleidoscopic image for each divided section displayed on said graphical user interface to match each one of said divided sections with said one of said kaleidoscopic images corresponding thereto.

14. The method of claim 13 further comprising the step of submitting the selections after the user has selected one said kaleidoscopic image for each said divided section for evaluation by said computing device to match each one of said divided sections with said one of said kaleidoscopic images corresponding thereto.

15. A method for providing a puzzle game on a computing device comprising:
  storing a source image on the computing device;
  displaying said source image on a graphical user interface of the computing device;
  dividing the source image into a plurality of discrete divided sections;
  displaying the discrete divided sections on said graphical user interface connected to the computing device, wherein said source image is shown by said divided sections;
  creating and then displaying on said graphical user interface of the computing device a plurality of modified images, each said modified image corresponding to and being comprised of one of the divided sections that has been reproduced one or more times to form reproductions, wherein the reproductions have then been rotated, reflected, or rotated and reflected relative to an original orientation of said divided section; and
  permitting a user to play the puzzle game by permitting the user to select one said modified image being displayed that corresponds to each one of the divided sections being displayed to match each one of said divided sections with said kaleidoscopic images corresponding thereto.

16. The method of claim 15, wherein said plurality of modified images is displayed in a carousel in a random order.

* * * * *